United States Patent [19]
Ehsani

[11] Patent Number: 5,072,166
[45] Date of Patent: Dec. 10, 1991

[54] POSITION SENSOR ELIMINATION TECHNIQUE FOR THE SWITCHED RELUCTANCE MOTOR DRIVE

[75] Inventor: Mehrdad Ehsani, Bryan, Tex.
[73] Assignee: The Texas A&M University System, College Station, Tex.
[21] Appl. No.: 539,982
[22] Filed: Jun. 18, 1990
[51] Int. Cl.$^5$ ............................................. H02P 8/00
[52] U.S. Cl. ....................................... 318/696; 318/685
[58] Field of Search ............... 318/696, 685, 701, 254, 318/138

[56] References Cited

U.S. PATENT DOCUMENTS

| | | | |
|---|---|---|---|
| 4,611,157 | 9/1986 | Miller | 318/696 |
| 4,772,839 | 9/1988 | MacMinn | 318/696 |
| 4,777,419 | 10/1988 | Obradovic | 318/696 |
| 4,868,478 | 9/1989 | Hedlund et al. | 318/696 |
| 4,959,596 | 9/1990 | MacMinn et al. | 318/254 |

OTHER PUBLICATIONS

MacMinn et al., "Application of Sensor Integration Techniques to Switched Reluctance Motor Drives," IEEE Industry Applications Conference Record 1988, pp. 584–588 (1988).

Primary Examiner—William M. Shoop, Jr.
Assistant Examiner—Saul M. Bergmann
Attorney, Agent, or Firm—Arnold, White & Durkee

[57] ABSTRACT

Rotor position information for a switched reluctance (SR) motor drive is obtained indirectly in response to the motor phase inductance. An oscillator generates a signal having a time period that is a function of the inductance. The signal is processed by other circuits to obtain proper instants of commutation. In the preferred motor drive, the energized phase windings are isolated from the oscillator, and periodic signals are obtained which have periods indicating the phase inductances of the unenergized phase windings. The periods are compared to threshold values to obtain position indicating signals, and commutating signals are derived from the position indicating signals.

20 Claims, 6 Drawing Sheets

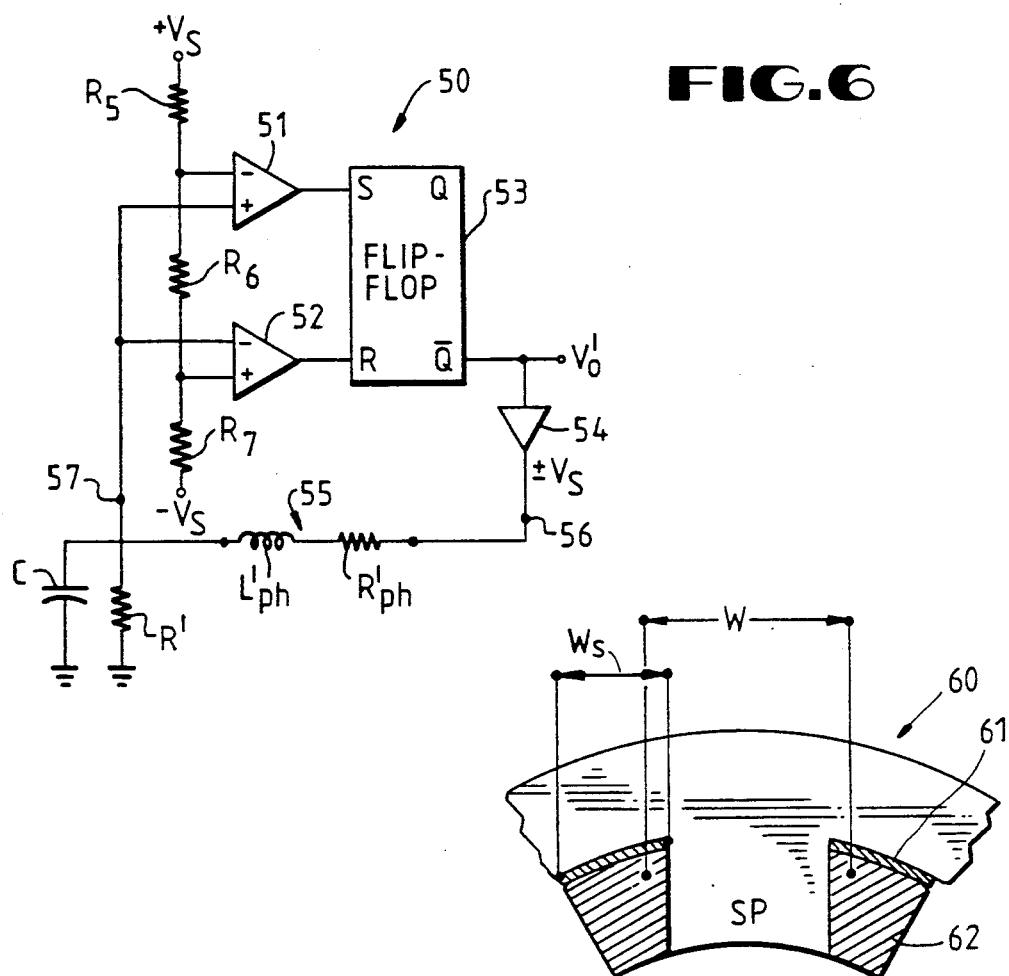
FIG.6
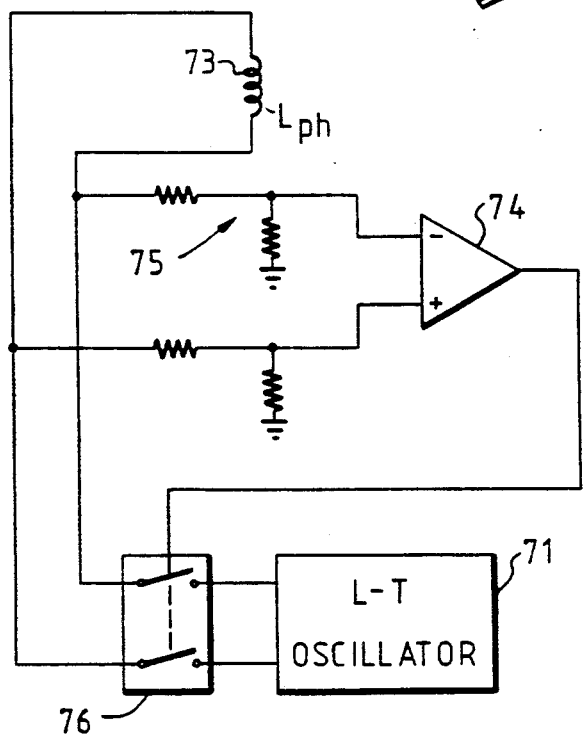
FIG.7
FIG.8

POSITION SENSOR ELIMINATION TECHNIQUE FOR THE SWITCHED RELUCTANCE MOTOR DRIVE

BACKGROUND OF THE INVENTION

1. Field of the Invention

The present invention relates generally to variable-speed motor drives, and more specifically to electronic commutation of a switched reluctance motor. In particular, the present invention relates to indirectly determining rotor position for electronic commutation in order to eliminate the need for a rotor position sensor.

2. Description of the Related Art

Variable speed drives of less than 20 kW preferably use brushless dc drives to obtain high efficiency and flexible control characteristics. In particular, the development of computer aided design tools and efficient power semiconductor devices have made the switched reluctance (SR) motor especially attractive.

The SR motor does not require permanent magnets and produces torque by the variable reluctance principle. A position sensor, however, is required in the SR drive in order to synchronize phase excitation pulses to the rotor position.

The process of deriving correctly phased signals from the rotor shaft position and using them to control the timing of switching operation of the power semiconductor devices in the drive is called "electronic commutation". The speed-torque characteristics of the SR motor can be flexibly controlled by changing the switching angles according to speed and torque requirements.

The sensing of rotor position is usually performed by optical or Hall-effect sensors. This involves mounting the sensors in close proximity to the rotor. Such a position sensor, however, constitutes a substantial fraction of the total system cost and tends to reduce the system reliability. For the appliance industry and particularly for hermetically sealed compressors, the factors of cost and reliability are especially important and have lead to consideration of an alternative technique of determining rotor position.

An indirect method of position sensing is described in McMinn, et al., "Application of the Sensor Integration Techniques to the Switched Reluctance Motor Drive," IEEE Industry Applications Conference Record 1988, pp. 584–588. In this method, short duration, low level voltage pulses are applied to the two unenergized phases of an SR motor and the resulting current pulses are measured to obtain an indication of the impedances of the unenergized motor phases and an estimation of the rotor angle. The circuitry for implementing this method, however, is rather complex and relatively expensive.

SUMMARY OF THE INVENTION

The primary object of the invention is to provide a reliable and cost effective method of indirectly determining the position of a rotor in a switched reluctance motor.

A specific object of the invention is to provide an accurate method of determining phase inductance in a switched reluctance motor.

In accordance with the most basic aspect of the present invention, rotor position information for a switched reluctance (SR) motor drive is obtained indirectly by sensing the motor phase inductance. The frequency-modulated signal is generated by an oscillator connected to stator windings of the motor. Other circuits are responsive to the frequency-modulated signal to provide proper instants of commutation.

BRIEF DESCRIPTION OF THE DRAWINGS

FIG. 6 is a schematic diagram of an inductance responsive oscillator that uses a precision Schmitt trigger;

FIG. 7 is a schematic diagram showing how an inductance-responsive coil could be used separate from the power windings;

FIG. 8 is a schematic diagram of a method for connecting the power windings to the inductance-responsive circuits only when the power windings are unenergized;

Figure 1:
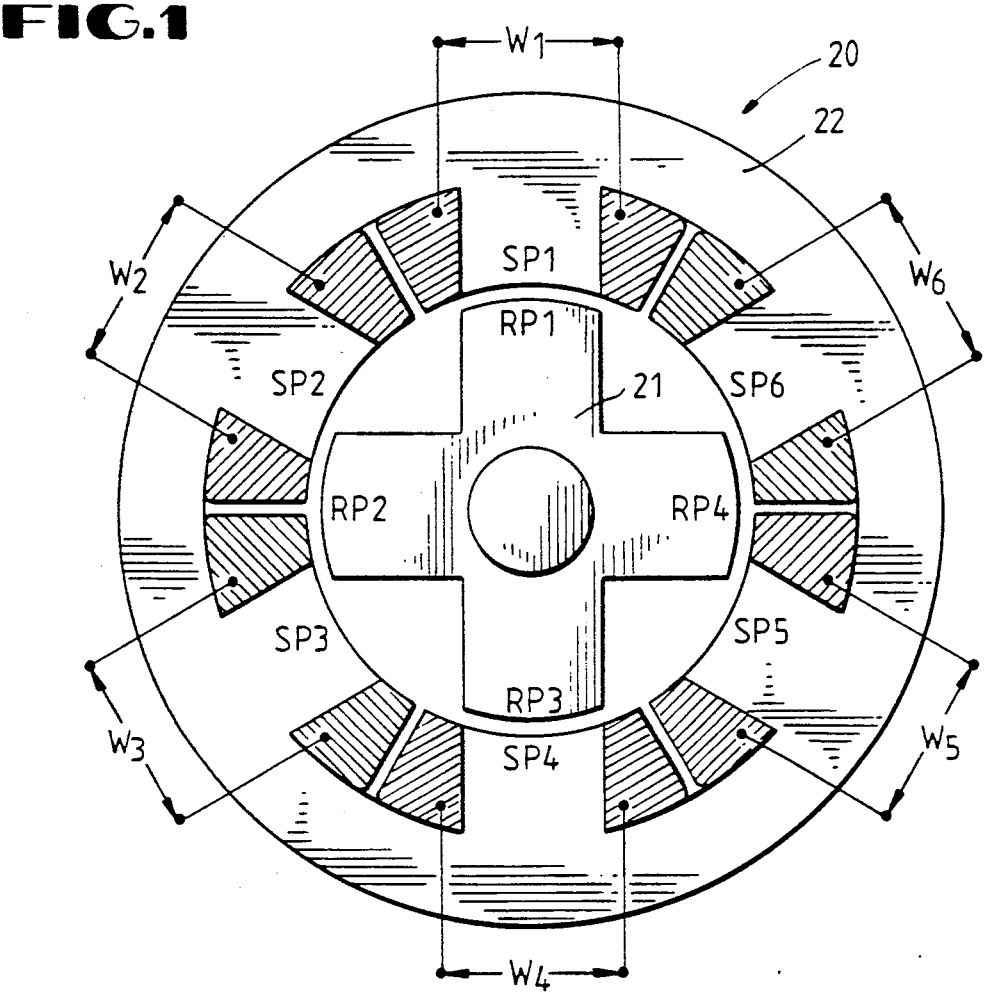
FIG. 1 is a schematic diagram of a switched reluctance (SR) motor.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings, there is shown in FIG. 1 a switched reluctance (SR) motor 20 having a rotor 21 and a stator 22. As shown, the rotor 21 has four poles RP1-RP4, and the stator 22 has six poles SP1-SP6. The present invention, however, can be used with SR motors having various numbers of rotor and stator poles.

In order to apply a torque to the rotor 21, respective windings W1-W6 are wound about the stator poles SP1-SP6. As will be further described below in connection with FIG. 2, the windings for pairs of diametrically opposite stator poles are wired together, and the pairs are energized by respective ones of three phases of current. In addition, the phase inductance varies appreciably as a function of rotor position so that when a pair of phase windings are energized, a torque is generated tending to align the rotor poles with the two stator poles having the energized windings.

To apply a relatively constant torque to the rotor 21 for rotation in either a forward or reverse direction, it is necessary to energize the phase windings in sequence as a function of the relative angular position of the rotor 21 with respect to the stator 22. The rotor position sensing has typically been done using optical or Hall sensors mounted in close proximity to the rotor 21. This has had an adverse effect upon the reliability of the motor and is relatively costly in terms of the cost of the sensors and the space occupied by the sensors in the motor assembly. Therefore, the present invention is directed to providing an indirect means by which the rotor position can be determined. In particular, the present invention involves generating a frequency-modulated signal responsive to the phase inductance of the unenergized windings of the motor.

Figure 2:
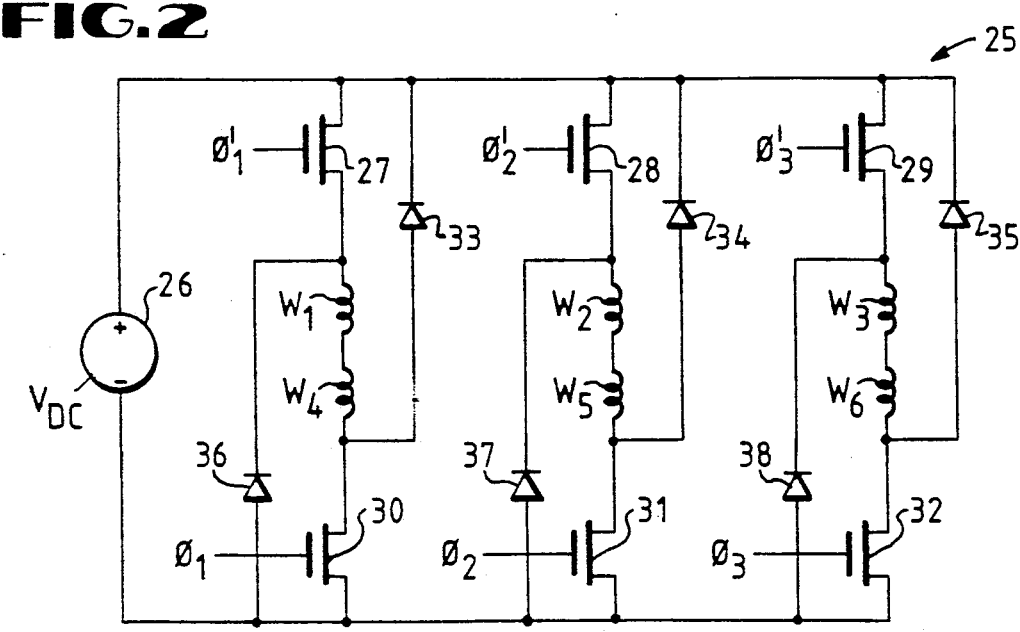
FIG. 2 is a schematic diagram of power circuits for the SR motor of FIG. 1.

Turning now to FIG. 2, there is shown a schematic diagram of the preferred power circuits which selectively energize the SP motor windings W1-W6 in response to phase commutating signals $\phi_1$, $\phi_2$, $\phi_3$, $\phi_1'$, $\phi_2'$, $\phi_3'$. As shown, the windings W1 and W4 are wired in series for the first phase, the windings W2 and W5 are wired in series for the second phase, and the windings W3 and W6 are wired in series for the third phase. The windings for the three phases are selectively connected to the positive voltage of a DC power supply 26 through respective electronic switches such as power field-effect transistors 27, 28 and 29. In a similar fashion, the phase windings are selectively connected to the negative voltage of the DC supply 26 by respective electronic switches such as power field-effect transistors 30, 31 and 32. To use the SR motor in a conventional household appliance, for example, the DC supply 26 includes a full-wave bridge rectifier for converting the standard 120 VAC household current to direct current.

Preferably two switching devices are used for each phase so that inductive energy stored in the winding circuits is recovered when the electronic switches shut off the flow of current to the windings. In particular, associated with the phase windings are directional diodes 33-38 which return power to the power supply 26 when the electronic switches 27-32 are turned off. This improves the electrical efficiency of the SR motor.

Figure 3:
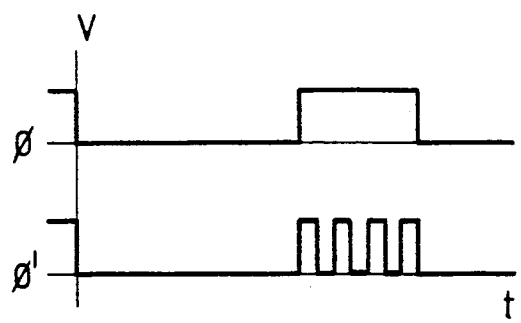
FIG. 3 is a timing diagram illustrating commutating signals used in the power circuits of FIG. 2.

Turning now to FIG. 3, there is shown a timing diagram of the commutating signals $\phi$, $\phi'$. Preferably the commutating signal $\phi$ has a duty cycle of 33⅓ percent, and the commutating signal $\phi'$ is commutated in a similar fashion and also gated by a pulse-width modulated signal. This scheme permits the speed of the motor to be controlled by the pulse-width modulation.

Figure 4:
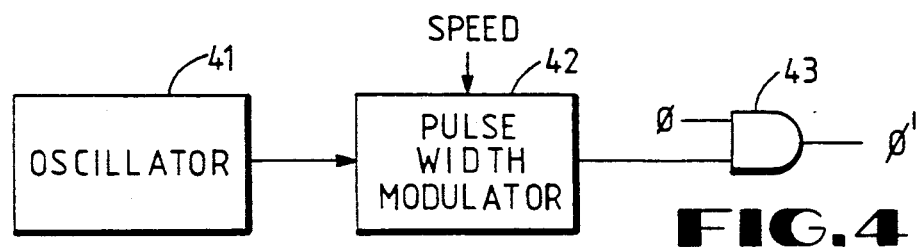
FIG. 4 is a schematic diagram showing how one of the commutating signals is modulated for speed control.

The derivation of the commutating signal $\phi'$ from the commutating signal $\phi$ is shown in FIG. 4. An oscillator 41 generates a periodic signal that is fed to a pulse-width modulator 42. The pulse-width modulator modulates the duty cycle of the periodic signal in response to a speed command signal. A gate 43 gates the commutating signal $\phi$ with the pulse-width modulated signal to provide the commutating signal $\phi'$.

Figure 5:
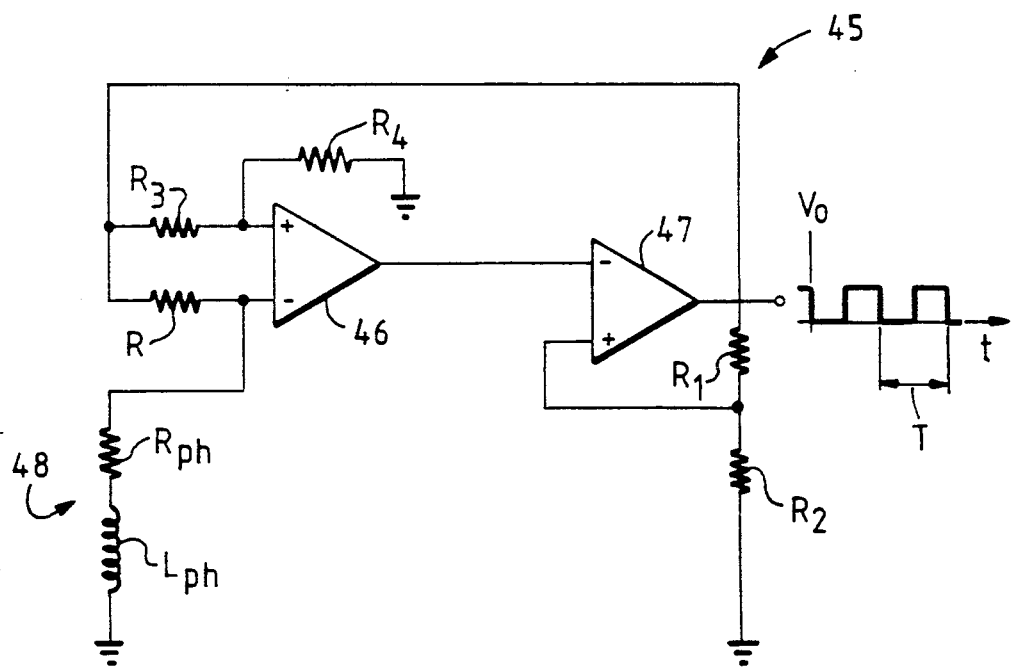
FIG. 5 is a schematic diagram of an inductance responsive oscillator that uses operational amplifiers.

Turning now to FIG. 5, there is shown a schematic diagram of an inductance responsive oscillator 45 having a linear inductance-to-time conversion characteristic. The oscillator 45 employs two operational amplifiers 46 and 47 to generate a periodic binary signal $V_o$ having a period T that is proportional to the phase inductance $L_{ph}$ of a respective pair of windings W1-W6 on the SR motor (20 in FIG. 1). The operational amplifiers 46 and 47 have no special requirements, and part No. 741 can be used. The circuit 45 is a kind of relaxation oscillator in which the second operational amplifier 47 is configured with positive feedback resistors $R_1$ and $R_2$ to act as a Schmitt trigger, and the first operational amplifier 46 is configured to provide a delay proportional to the L/R time constant of the phase windings 48 and a resistor R. In addition, the first operational amplifier 46 is provided with resistors $R_3$ and $R_4$ which ensure that the DC gain of the first operational amplifier is positive, but the AC gain of the first operational amplifier is negative, causing the oscillator 45 to self-start immediately under all conditions. The values of $R_1$, $R_2$, $R_3$, and $R_4$ are, for example, 10K ohms.

The time period T of the periodic signal $V_o$ is given by:

$$T = K\, L_{ph}/(R + R_{ph})$$

where $L_{ph}$ is the phase inductance of the SR motor windings, $R_{ph}$ is the phase inductance of the SR motor windings, and K is a constant on the order of 1 that is set by the ratio of R3 to R4 and the saturation voltage levels of the operational amplifiers 46 and 47. Therefore, by selecting the value of R, the frequency of the periodic signal $V_o$ can be selected to be relatively high compared to the maximum rotational velocity of the rotor 21 to give a rather precise indication of the position of the rotor. In this regard, the period T of the periodic signal $V_o$ represents a certain minimum time for the oscillator 45 to provide a signal indicating the value of phase inductance. The preferred frequency of the periodic signal $V_o$ is about 5 to 20 kHz or higher, with higher frequencies preferred for operating the SR motor at higher maximum rotational velocities.

Turning now to FIG. 6, there is shown an alternative inductance responsive oscillator circuit 50 that employs a precision Schmitt trigger including resistors $R_5$, $R_6$, $R_7$ for setting upper and lower voltage thresholds, threshold comparators 51 and 52, a set-reset flip-flop 53, and an output driver 54. Such a precision Schmitt trigger is easily fabricated as an integrated circuit and a similar circuit is used in the conventional type 555 timer integrated circuit.

To provide a signal indicating the phase inductance $L_{ph}'$, the windings 55 are part of a low-pass filter providing feedback from an output terminal 56 to an input terminal 57 of the precision Schmitt trigger. The low-pass filter includes a shunt resistance R' which also sets the frequency of oscillation such that the period is proportional to the phase inductance $L_{ph}'$ according to:

$$T' = K'\, L_{ph}'/(R' + R_{ph}')$$

where K' is a constant on the order of 1 that is set by the thresholds of the precision Schmitt trigger. A capacitor C can also be included in the low-pass filter to reject noise pulses from the switching of the power circuits.

For the sake of economy, it is desirable for the inductance responsive oscillator 45 or 50 to be constructed using relatively low voltage circuits. For many applications, however, it is desirable to drive the motor windings W1-W6 with much higher voltages. In this case, the motor windings W1-W6 should not be connected directly to the inductance responsive oscillators. One way to solve this problem is to use a potential transformer across each phase winding to isolate the inductance responsive oscillator from the power circuits. The use of such a potential transformer, however, changes considerably the phase inductance that the oscillator is responsive to. If the potential transformer has a ratio of N:1, then the effective inductance sensed by the oscillator will be $L_{eq}+L_{ph}/N^2$, where $L_{eq}$ is the transformer equivalent inductance referred to the low voltage winding. Therefore, the presence of the transformer equivalent inductance reduces the accuracy of the oscillator's response to the phase inductance.

Turning to FIG. 7, there is shown an alternative method of isolating the inductance responsive oscillators from the phase windings. In this case, a SR motor 60 has inductance responsive windings $W_s$ that are separate from the power windings W. In particular, each inductance responsive winding $W_s$ includes windings 61 about the base of a respective stator pole SP, and the power windings include windings 62 wound over the inductance sensing windings 61 about the stator pole. The inductance responsive windings 61 include a relatively small number of turns compared to the power windings 62, so that the voltages induced on the inductance responsive windings 61 are relatively small when the power windings 62 are energized.

Turning now to FIG. 8, there is shown another method of isolating an inductance responsive oscillator 71 when its respective motor windings 72 are energized. In this case, a comparator 74 has its inputs connected via a resistive voltage divider 75 across the windings 73. The comparator 74 senses whether the phase windings 73 are energized. If the phase windings are energized, then the comparator activates an analog switch 76 to disconnect the inductance responsive oscillator 71 from its respective phase windings 73. Alternatively, the analog switch 76 could be controlled by the control circuitry that energizes the phase winding 73, but that control circuitry should also include timing circuitry that activates the analog switch to reconnect the inductance responsive oscillator 71 to the phase windings 73 only after a certain delay time during which the voltage across the phase windings can decay to a relatively low level.

Figure 9:
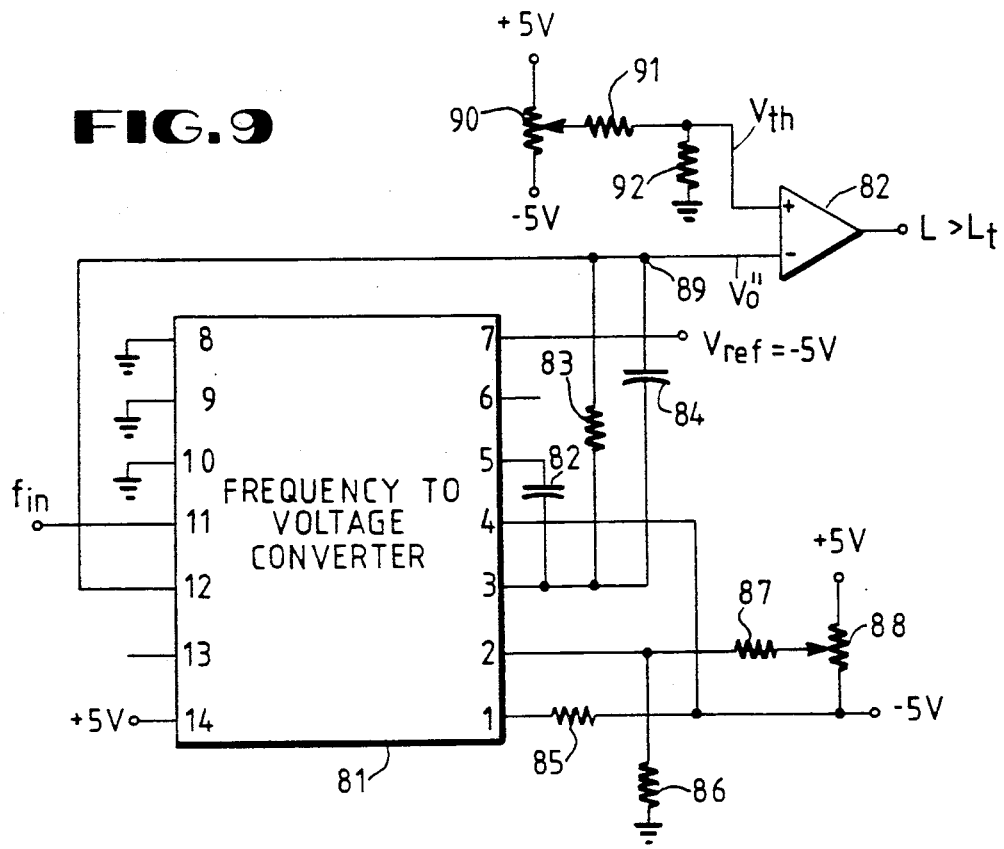
FIG. 9 is a schematic diagram of a frequency-to-voltage converter and a threshold detector.

In order to derive the commutating signals $\phi$, $\phi'$ from the periodic signals from the inductance responsive oscillators, the periods of the periodic signals are compared to threshold values to obtain position indicating signals. As shown in FIG. 9, this can be done by using a frequency-to-voltage converter 81 and a threshold comparator 82. The frequency-to-voltage converter 81, for example, is an integrated circuit such as Part No. TSC 9400CJ. This integrated circuit 81 operates in connection with a reference capacitor 82, an integrating resistor 83, an integrating capacitor 84, and resistors 85, 86, 87 and 88. The output voltage $V_o''$ of the frequency-to-voltage converter is determined according to:

$$V_o''=(V_{ref}C_{ref}R_{int})f_{in}$$

where $V_{ref}$ is a reference voltage supplied to pin 7 of the integrated circuit 81, $C_{ref}$ is the value of the reference capacitor 82, and $R_{int}$ is the value of the integrating resistor $R_{int}$.

The input frequency $f_{in}$ is provided by the output $V_o$ of the inductance responsive oscillator 45 of FIG. 5. The input frequency $f_{in}$ is converted to a voltage level on an output line 89. Therefore, the voltage on the output line 89 is inversely proportional to phase inductance. To determine when the phase inductance reaches a predetermined value, the comparator 82 compares the voltage $V_o''$ on the converter output 89 to a reference voltage $V_t$ selected by a potentiometer 90 and a voltage divider including resistors 91 and 92.

Figure 10:
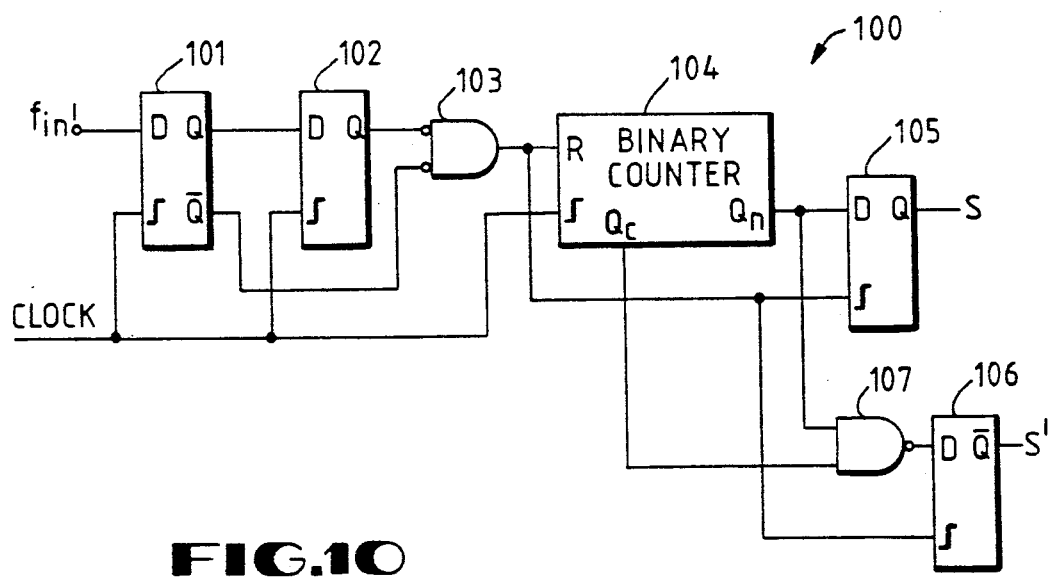
FIG. 10 is a schematic diagram of a digital frequency counter and a digital threshold detector.

Turning now to FIG. 10, there is shown an alternative circuit using digital logic for generating signals S and S' for indicating when the phase inductance exceeds respective first and second levels. The circuit 100 receives, for example, the periodic signal from the inductance responsive oscillator 50 of FIG. 6 and compares its frequency $f_{in}$ to preselected submultiples of the frequency of a high speed clock (CLOCK). A first delay flip-flop 101 synchronizes the periodic signal to the high speed clock. Then a second delay flip-flop 102 and a NOR gate 103 detect the presence of a low-to-high transition in the periodic signal. When such a transition occurs, the gate 103 resets a binary counter 104 that is clocked by the high speed clock.

To detect when the frequency $f_{in}'$ is less than a first preselected frequency, a delay flip-flop 105 is clocked by the reset pulse from the gate 103 and receives the $Q_n$ output of the nth binary stage of the counter 104. Therefore, the delay flip-flop 105 generates a signal S which is a logic low when the frequency $f_{in}'$ is greater than the frequency of the clock divided by $2^n$, and it is a logic high when the frequency $f_{in}'$ is less than the frequency of the clock divided by $2^n$. In a similar fashion, a second flip-flop 106 is clocked by the reset pulse and receives the output of a NAND gate 107 which combines the output of the nth and cth stages of the binary counter 104. Therefore, the signal S' is a logic low when the frequency $f_{in}'$ is greater than the clock frequency divided by $(2^n+2^c)$, and the signal S' is a logic high when the frequency $f_{in}'$ is less than the frequency of the clock divided by $(2^n+2^c)$.

Figure 11:
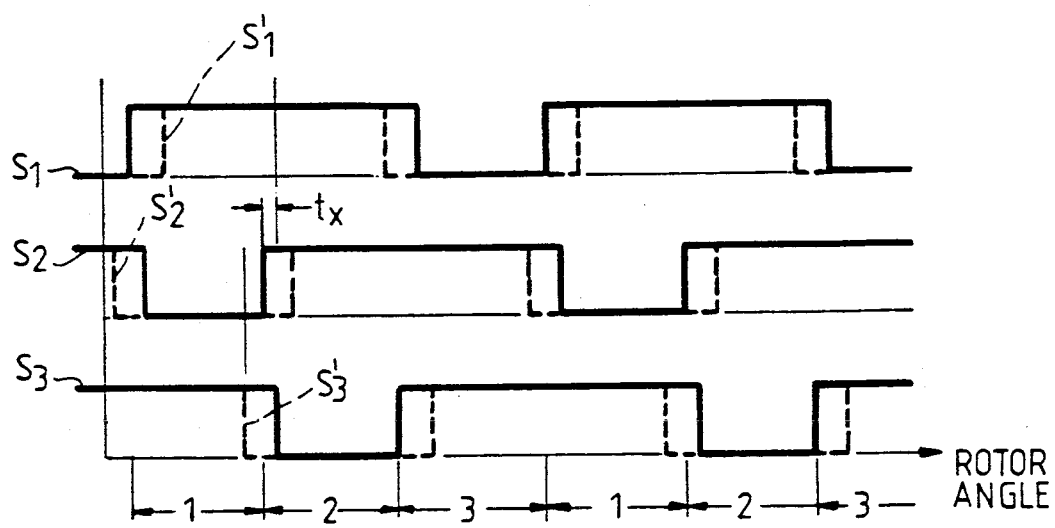
FIG. 11 is a diagram of rotor position indicating signals provided by the circuits of FIG. 10 as a function of rotor angle.

Turning now to FIG. 11, there is shown a diagram illustrating the desired relationships between the signals S and S' for each of the three phases of the SR motor (20 in FIG. 1) as a function of the angle of the rotor with respect to the stator. These relationships result from the circuit of FIG. 10, for example, by selection of the clock frequency, the number n of stages in the binary counter, and the number c of stages which selects the difference between the threshold levels of the signals S and S'. In particular, the leading edges of the signals S define the instant of time when the phase windings are energized and deenergized in sequence during continuous rotation of the rotor 21 of the SR motor 20. For efficiency, it is desired that the phase windings for a respective set of opposite poles be commutated to begin deenergization of the windings slightly prior to the alignment of the poles. This defines the interval $t_x$ in FIG. 11.

The phase windings are energized in sequence during the intervals denoted 1, 2, and 3 between the leading edges of the signals S as shown in FIG. 11. This relationship between the signals S, however, makes it somewhat difficult to start the motor from a rest position since the initial rotor position cannot be determined with sufficient certainty in the case when all of the S signals happen to be high. Therefore, it is desirable to provide a second position indicating signal S' for each of the three phases. Once this is done, the initial starting and running of the SR motor can be readily performed by control logic responsive to the signals S and S'.

Figure 12:
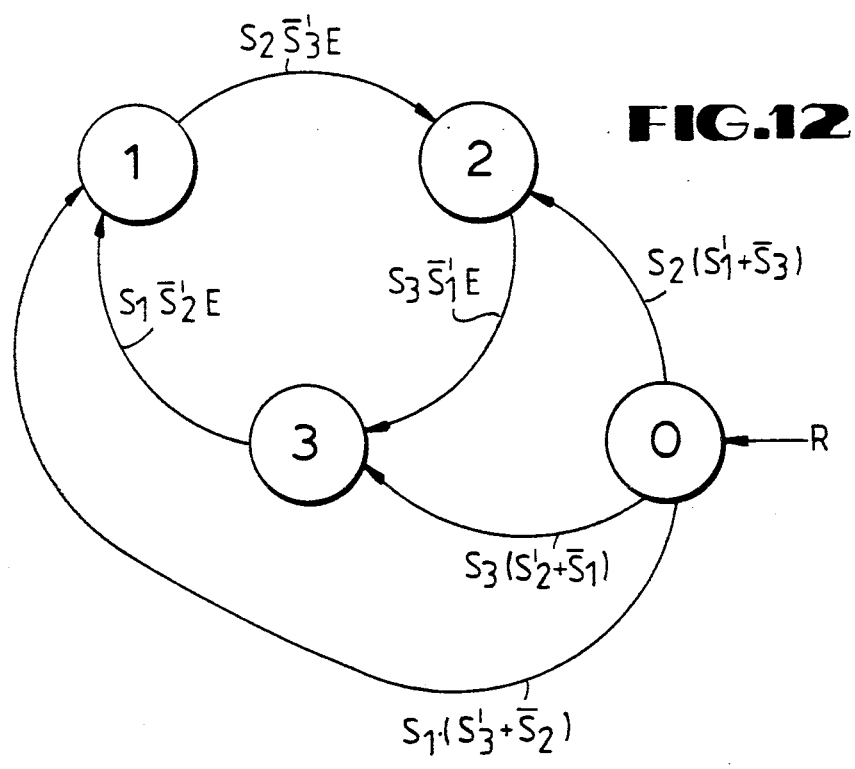
FIG. 12 is a state diagram illustrating how the commutation signals for the power circuits of FIG. 2 are derived from the position indicating signals shown in FIG. 11.

Turning to FIG. 12, there is shown a state diagram of control logic for starting and running the SR motor in a single direction in response to the position indicating signals S and S'. The control logic has four states, including an initial state 0, and states 1, 2 and 3 through which the control logic cycles when the motor is running. When the control logic is in state 1, the first phase windings W1 and W4 are energized; in state 2, the second phase windings W2 and W5 are energized; and in state 3, the third phase windings W3 and W6 are energized. The initial state 0 is reached in response to a reset signal R which is generated when the motor is initially turned on and whenever the motor is found to be in a "stall" condition. From the initial state 0, either state 1, 2 or 3 is reached depending upon the logic states of the position indicating signals S and S' for all three phases. Once states 1, 2 and 3 are reached, however, the next state in cyclic order 1, 2, 3, 1, 2, 3 etc. is reached depending upon the logic states of the signals S and S' for the unenergized phases, and only when an enable signal E indicates that these unenergized phases have been unenergized for a predetermined amount of time sufficient to guarantee that the inductance responsive oscillator will properly indicate phase inductance and hence rotor position.

Figure 13:
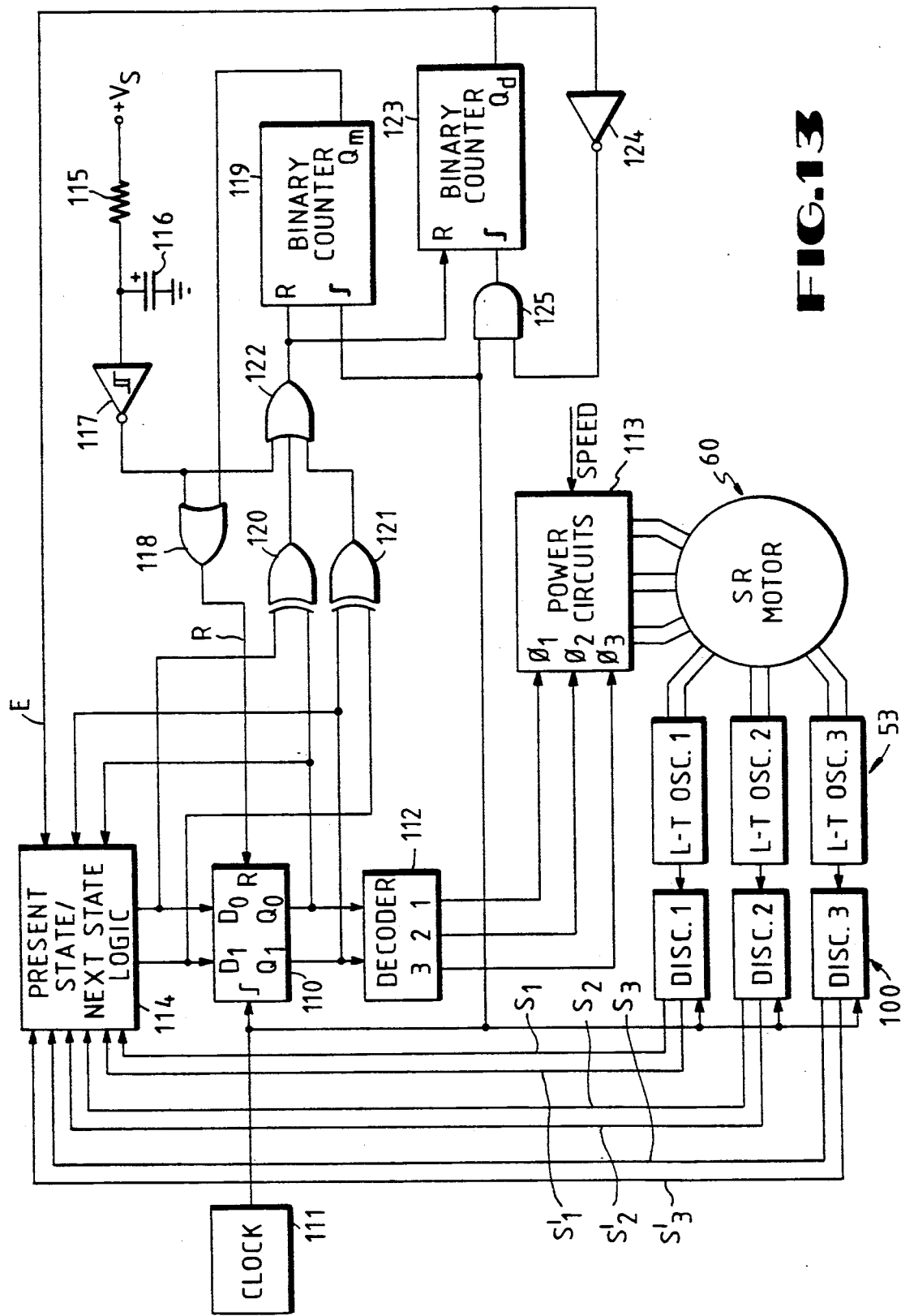
FIG. 13 is a schematic diagram of control circuits which operate in accordance with the state diagram of FIG. 12.

Turning now to FIG. 13, there is shown a schematic diagram of control logic which operates according to the state diagram in FIG. 12. As should be evident from FIG. 13, it would be possible to integrate all of the control logic together with the inductance responsive oscillators 53 and frequency discriminators 100 on a relatively small integrated circuit.

The four states of the control logic are defined by a two-stage register 110 clocked by a high-speed clock 111. The outputs of this register are decoded by a decoder 112 to provide the commutating signals $\phi_1$, $\phi_2$ and $\phi_3$ for power circuits 113. The power circuits 113 drive the SR motor 60. The position of the rotor in the SR motor 60 is determined by an oscillator 53 and a discriminator 100 for each of the three phases. The position indicating signals S and S' from each discriminator are fed to present state/next state logic 114 which determines the next state of the register 110. The present state/next state logic is defined by the following truth table:

TABLE I

| \multicolumn{10}{c}{PRESENT STATE/NEXT STATE LOGIC} | | | | | | | | | |
| $D_1$ | $D_0$ | $Q_1$ | $Q_0$ | E | $S'_3$ | $S_3$ | $S'_2$ | $S_2$ | $S'_1$ | $S_1$ |
|---|---|---|---|---|---|---|---|---|---|---|
| 0 | 1 | 0 | 0 | d | 1 | d | d | d | d | 1 |
| 0 | 1 | 0 | 0 | d | d | d | d | 0 | d | 1 |
| 1 | 0 | 0 | 0 | d | d | d | d | 1 | 1 | d |
| 1 | 0 | 0 | 0 | d | d | 0 | d | 1 | d | d |
| 1 | 1 | 0 | 0 | d | d | 1 | 1 | d | d | d |
| 1 | 1 | 0 | 0 | d | d | 1 | d | d | d | 0 |
| 1 | 0 | 0 | 1 | 1 | 0 | d | d | 1 | d | d |
| 1 | 1 | 1 | 0 | 1 | d | 1 | d | d | 0 | d |
| 0 | 1 | 1 | 1 | 1 | d | d | 0 | d | d | 1 |

The register 110 is initially put in the zero state by a reset signal R. This reset signal is generated upon a power on condition by a resistor 115, a capacitor 116, a Schmitt trigger invertor 117 and a OR gate 118. The reset signal is also generated when a stall condition is detected by a binary counter 119. The binary counter 119 is clocked by the clock 111 and during normal operation, it is reset by the Schmitt trigger invertor 117 or periodically when the register 110 changes its state, as detected by exclusive OR gates 120, 121 and an OR gate 122. The binary counter has a sufficient number m of stages to define a predetermined time interval sufficiently long so that the binary counter 119 will be reset during that time interval unless the motor 60 is stalled.

The present state/next state logic 114 uses an enable signal E. This enable signal is provided by another binary counter 123 which is also reset by any transition in the state of the register 110. The counter 123 counts for a predetermined delay following the transition of the register 110. The predetermined delay is indicated by a logic low output of the dth stage of the counter 123. The enable signal is fed back through an invertor 124 to a gate 125 which gates the clock to the counter 123 in order to hold the enable signal high until the next transition in the state of the register 110.

In view of the above, there has been described a reliable and cost-effective method of indirectly determining the position of a rotor in a switched reluctance motor. The method is reliable because phase inductance is a precisely defined function of rotor position, and the ratio of maximum to minimum phase inductance in a SR motor is usually three or greater. By determining the phase inductance with an oscillator circuit, the inductance determination can be relatively immune to the energizing of other phase windings. In particular, accurate position indicating signals are obtained by measuring the periods of the periodic signals from the inductance responsive oscillators when the respective phase windings are not energized. In addition, the inductance responsive oscillators, frequency discriminators, and control logic for generating the commutating signals can be provided on an integrated circuit which makes the method of the present invention cost effective.

It should be apparent to persons of ordinary skill that the preferred embodiment of the invention is susceptible to various modifications. More complex controls could be used in connection with the inductance responsive oscillators to more precisely indicate the position of the rotor. This additional rotor position information could be used, for example, to adjust the speed and torque characteristics of the SR motor by advancing or retarding the commutating signals. The control logic, for example, could include logic for reversing the direction of the motor or for providing a decelerating as well as an accelerating torque on the rotor. Moreover, a microprocessor or microcontroller could be used for generating the commutating signals in response to phase inductance information. The microprocessor or microcontroller, for example, could use an analog-to-digital converter in connection with the frequency-to-voltage converter of FIG. 9, or could use a multi-bit register strobed to receive the value of the binary counter 104 in FIG. 10 in response to the reset signal from the gate 103, to obtain a numerical value of the phase inductance. From the numerical value of the phase inductances of the unenergized phases, the microprocessor or microcontroller could calculate the phase angle of the rotor in the SR motor.

What is claimed is:

1. An indirect method for estimating instantaneous rotor position in a switched reluctance motor having multiple stator phases which are energized in synchronism with rotor position, said method comprising the steps of:
  (a) generating a periodic signal having a frequency and a period responsive to phase inductance of said motor, said period being a reciprocal of said frequency, and
  (b) estimating the instantaneous rotor position from said periodic signal.

2. The method as claimed in claim 1, wherein said period is proportional to said phase inductance.

3. The method as claimed in claim 1, wherein said estimating of the instantaneous rotor position is performed by measuring the period of said periodic signal, and comparing the period of said periodic signal to a threshold value.

4. The method as claimed in claim 1, wherein said estimating of the instantaneous rotor position is performed by measuring the frequency of said periodic signal, and comparing the frequency of said periodic signal to a threshold value.

5. The method as claimed in claim 1, wherein step (a) is performed to obtain a first periodic signal having a first frequency and a first period responsive to phase inductance of a first unenergized stator phase winding of said motor when at least a third stator phase winding of said motor is energized, and step (a) is also performed to obtain a second periodic signal having a second frequency and a second period responsive to phase inductance of a second unenergized stator phase winding of said motor when said third stator phase winding of said motor is energized, and the instantaneous rotor position is estimated from said first and second periodic signals.

6. The method as claimed in claim 5, further comprising the step of energizing one of the unenergized stator phase windings in response to the estimated instantaneous rotor position.

7. The method as claimed in claim 5, further comprising the step of inhibiting the generation of said first periodic signal when said first unenergized winding becomes energized.

8. An apparatus for estimating instantaneous rotor position in a switched reluctance motor having multiple stator phase windings which are energized in synchronism with rotor position, said apparatus comprising:
  means for generating a periodic signal having a frequency and a period responsive to said phase inductance of said motor, said period being a reciprocal of said frequency, and
  means for estimating the instantaneous rotor position from said periodic signal.

9. The apparatus as claimed in claim 8, wherein said means for generating includes an oscillator for generating said periodic signal.

10. The apparatus as claimed in claim 9, wherein said oscillator has a linear inductance-to-time characteristic such that said period is proportional to said phase inductance.

11. The apparatus as claimed in claim 9, wherein said oscillator includes a Schmitt trigger.

12. The apparatus as claimed in claim 8, wherein said means for estimating the instantaneous rotor position includes a frequency-to-voltage converter.

13. The apparatus as claimed in claim 8, wherein said means for estimating the instantaneous rotor position includes a binary counter that is clocked to measure the period of said periodic signal.

14. The apparatus as claimed in claim 8, wherein said means for estimating includes means for comparing said period of said periodic signal to a predetermined threshold value.

15. The apparatus as claimed in claim 8, wherein said means for estimating the instantaneous rotor position includes means for deriving a voltage level responsive to said period, and means for comparing said voltage level to a threshold level.

16. The apparatus as claimed in claim 8, wherein said means for generating includes a first oscillator for generating a first periodic signal having a first frequency and a first period responsive to phase inductance of a first unenergized stator phase winding of said motor when at least a third stator phase winding of said motor is energized, and a second oscillator for generating a second periodic signal having a second frequency and a second period responsive to phase inductance of a second unenergized stator phase winding of said motor when said third stator phase winding of said motor is energized, and wherein said means for estimating includes means for estimating the instantaneous rotor position from the first and second periodic signals.

17. The apparatus as claimed in claim 16, further comprising means for energizing one of the unenergized windings in response to the estimated instantaneous rotor position.

18. The apparatus as claimed in claim 8, wherein said means for generating includes means for generating a plurality of periodic signals having respective frequencies and periods responsive to inductances of unenergized ones of the stator phase windings, said means for estimating includes means for providing a plurality of position indicating signals in response to said plurality of periodic signals, and said apparatus further comprises means for deriving commutation signals for energizing said stator phase windings of said motor in response to said plurality of position indicating signals.

19. The apparatus as claimed in claim 8, further comprising analog switches for selectively connecting said phase windings to said means for generating, and means for operating said analog switches to disconnect each phase winding from said means for generating when said each phase winding is energized.

20. Apparatus for energizing multiple stator phase windings of a switched reluctance motor in synchronism with rotor position, said stator phase windings having phase inductances responsive to said rotor position, said apparatus comprising:
  oscillators connected to stator phase windings of said motor for generating periodic signals having respective frequencies responsive to said phase inductances;
  frequency discriminators connected to said oscillators for providing rotor position indicating signals in response to said periodic signals;
  logic circuits connected to said frequency discriminators for providing respective commutating signals from said rotor position indicating signals; and
  power circuits connected to said logic circuits and responsive to said commutating signals for selectively energizing said multiple stator phase windings in synchronism with said rotor position.

* * * * *